United States Patent
Boesjes (10) Patent No.: US 7,924,927 B1
(45) Date of Patent: Apr. 12, 2011

(54) DISTRIBUTED FUNCTIONALITY IN A WIRELESS COMMUNICATIONS NETWORK

(76) Inventor: Eimar M. Boesjes, Eugene, OR (US)

( * ) Notice: Subject to any disclaimer, the term of this patent is extended or adjusted under 35 U.S.C. 154(b) by 1425 days.

(21) Appl. No.: 11/276,959

(22) Filed: Mar. 18, 2006

Related U.S. Application Data (60) Provisional application No. 60/663,851, filed on Mar. 21, 2005.

(51) Int. Cl.
*H04N 7/18* (2006.01)
(52) U.S. Cl. .............................. 375/240.26; 375/240.01
(58) Field of Classification Search .......... 348/143–160; 375/240.01–240.29
See application file for complete search history.

(56) References Cited

U.S. PATENT DOCUMENTS

| | | | |
|---|---|---|---|
| 5,757,784 A | 5/1998 | Liebowitz et al. |
| 5,774,802 A | 6/1998 | Tell et al. |
| 5,845,211 A | 12/1998 | Roach |
| 5,987,108 A | 11/1999 | Jagadish et al. |
| 6,070,070 A | 5/2000 | Ladue |
| 6,173,171 B1 | 1/2001 | Plush et al. |
| 6,266,401 B1 | 7/2001 | Marchbanks et al. |
| 6,282,274 B1 | 8/2001 | Jain et al. |
| 6,332,075 B1 | 12/2001 | Verdonk |
| 6,445,916 B1 | 9/2002 | Rahman |
| 6,459,779 B2 | 10/2002 | Wardin et al. |
| 6,463,275 B1 | 10/2002 | Deakin |
| 6,466,660 B1 | 10/2002 | Merriam |
| 6,484,150 B1 | 11/2002 | Blinn et al. |
| 6,553,218 B1 | 4/2003 | Boesjes |
| 6,594,692 B1 | 7/2003 | Reisman |
| 6,704,768 B1 | 3/2004 | Zombek et al. |
| 6,763,226 B1 | 7/2004 | McZeal |
| 6,769,010 B1 | 7/2004 | Knapp et al. |
| 6,847,992 B1 | 1/2005 | Haitsuka et al. |
| 6,868,399 B1 | 3/2005 | Short et al. |
| 6,956,833 B1 | 10/2005 | Yukie et al. |
| 6,975,851 B2 | 12/2005 | Boesjes |
| 7,027,773 B1 | 4/2006 | McMillin |
| 2002/0062270 A1 | 5/2002 | Star |
| 2006/0148447 A1 | 7/2006 | Boesjes |

OTHER PUBLICATIONS

WO 97/25826 A (Bolt Beranek and Newman Inc) Jul. 17, 1997.
WO 99/05829 A (Massachusetts Institute of Technology) Feb. 4, 1999.
WO 00/24161 A (Nokia Networks Oy; Wallenius, Jukka) Apr. 27, 2000.

*Primary Examiner* — Andy S Rao
(74) *Attorney, Agent, or Firm* — David S. Alavi (57) ABSTRACT

A wireless network apparatus comprises: a wireless transmitter and receiver operated according to at least one recognized wireless communications protocol; a data storage unit; and a programmed processor. The processor is programmed for establishing direct and indirect links with wireless network nodes, storing wireless connectivity data, transmitting wireless connectivity data to the linked nodes for storage, receiving connectivity data from the linked nodes for storage. The wireless network apparatus may function as a wireless network node apparatus, and wireless network terminus, and/or a wireless portal node. Wireless connectivity data, wireless network terminus data, and/or other data associated with the wireless network may be redundantly stored distributed among the wireless network nodes. The wireless network apparatus may be further adapted for enhancing network connectivity, capacity, security, reliability, and/or functionality of the wireless network.

42 Claims, 5 Drawing Sheets

DISTRIBUTED FUNCTIONALITY IN A WIRELESS COMMUNICATIONS NETWORK

BENEFIT CLAIMS TO RELATED APPLICATIONS

This application claims benefit of U.S. provisional App. No. 60/663,851 filed Mar. 21, 2005, said provisional application being hereby incorporated by reference as if fully set forth herein.

BACKGROUND

The field of the present invention relates to wireless communications networks.

This application may be related to subject matter disclosed in U.S. non-provisional application Ser. No. 09/715,705 filed Nov. 17, 2000 (now U.S. Pat. No. 6,553,218), in U.S. non-provisional application Ser. No. 10/393,584 filed Mar. 21, 2003 (now U.S. Pat. No. 6,975,851), and in U.S. non-provisional application Ser. No. 11/298,558 filed Dec. 9, 2005, each of said applications being hereby incorporated by reference as if fully set forth herein.

The above-cited references disclose, inter alia, apparatus and methods for implementing a wireless communications network, including so-called "mesh networks". In a mesh network, a pair of network nodes may be connected by multiple pathways through the network, resulting in redundancy that enhances the reliability of network connectivity. If network nodes are mobile in such a mesh network, pathways through the system may be constantly changing, and the network pathways (optimal or possible) connecting a pair of network nodes may vary dramatically with time. Tracking the movement and connectivity of moving network nodes, and storage of and access to this information, allows ongoing evaluation of network coverage and performance, and routing of data packets through the network to a destination as the available network paths to the destination change. A centralized administration unit may be employed to track the movement and connectivity of moving network nodes, and/or such information may be stored locally at each node and its neighbors. User (i.e., subscriber) identification data, authentication data, and/or usage and billing data may be similarly tracked, stored, and accessed, centrally and/or distributed locally. Distributed local storage (at each network apparatus and redundantly at its neighbors) may enhance the redundancy and reliability of the wireless network, and is the subject of this disclosure.

SUMMARY

A wireless network apparatus comprises: a wireless transmitter and receiver operated according to at least one recognized wireless communications protocol; a data storage unit; and a programmed processor. The processor is programmed for: i) establishing a wireless communications link between the wireless network apparatus and at least one other wireless network apparatus, and identifying each such wirelessly linked other wireless network apparatus; ii) storing wireless connectivity data including identification data pertaining to other wireless network apparatus wirelessly linked to the wireless network apparatus; iii) transmitting said wireless connectivity data to at least one other wireless network apparatus, said transmitted data for storage at the other wireless network apparatus to which it is transmitted; and iv) receiving and storing in the data storage unit additional wireless connectivity data from at least one other wireless network apparatus. Wireless connectivity data as well as other data stored by a wireless network apparatus may also be stored distributed among other wireless network apparatus directly and indirectly wirelessly linked to the wireless network apparatus.

The wireless network apparatus may function as a wireless network access point apparatus, a wireless network node apparatus, a wireless network terminus, and/or a wireless portal node apparatus. Wireless connectivity data, wireless network terminus data, and/or other data associated with the wireless network may be redundantly stored distributed among the wireless network apparatus. The wireless network apparatus may be further adapted for enhancing connectivity, capacity, security, reliability, and/or functionality of the wireless network.

Objects and advantages pertaining to wireless communications networks may become apparent upon referring to the disclosed embodiments as illustrated in the drawings and disclosed in the following written description and/or claims.

The embodiments shown in the Figures are exemplary, and should not be construed as limiting the scope of the present disclosure and/or appended claims.

DETAILED DESCRIPTION OF EMBODIMENTS

Figure 1:
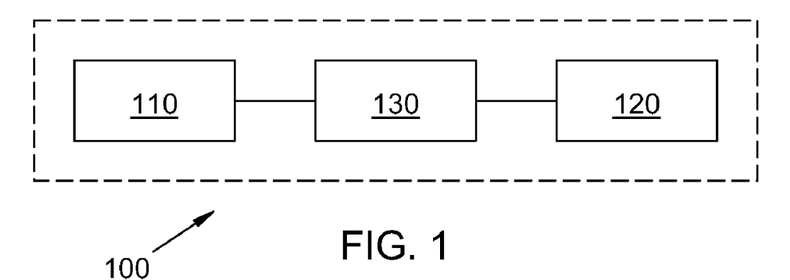
FIG. 1 is a schematic block diagram of an exemplary wireless network apparatus.

A wireless network apparatus 100 is shown schematically in FIG. 1, and comprises a wireless transmitter and receiver 110, a data storage unit 120, and a programmed processor 130. The transmitter and receiver 110 (also referred to collectively as transceiver 110) are operated according to at least one recognized wireless communications protocol. A single wireless network apparatus may operate according to multiple protocols, either simultaneously or using only one protocol at any given time. Wireless telecommunications protocols conforming to 802.11 standards (802.11a, 802.11b, 802.11g, and so forth; also known as WiFi) may be employed. Any other suitable wireless telecommunications protocol or group of protocols (such as 802.16 protocols, wireless telephone protocol(s), and/or other protocols, for example) may be employed as well, and such use shall fall within the scope of the present disclosure and/or appended claims. Data storage unit 120 may comprise any suitable storage medium on which digitally formatted data may be written and rewritten and from which such data may be retrieved. A suitable medium should preferably retain stored data even when deprived of electrical power, or the wireless network apparatus should preferably include some sort of uninterruptable power supply or battery backup. A wide range of suitable storage media may be employed within the scope of the present disclosure and appended claims, and may include (but are not limited to): magnetic disk media (fixed hard drive or removable disks or drives); solid-state media (such as EEPROM, Flash® memory, and so on); other media. The processor 130 is programmed with instructions for performing the variety of functions of the wireless network apparatus, as set forth hereinbelow.

Figure 2:
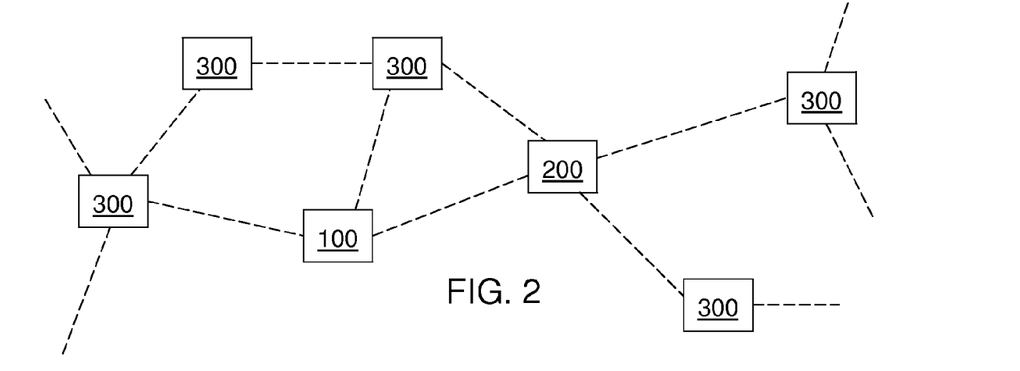
FIG. 2 is a schematic diagram illustrating multiple linked wireless network apparatus.

A wireless communications link is established between a wireless network apparatus 100 and at least one other wireless network apparatus 200 (FIG. 2; dotted lines indicate direct wireless communication links). The other wireless network apparatus 200 is identified, and its identity is included in wireless connectivity data stored by the storage unit 120. The wireless connectivity data is transmitted to at least one other wireless network apparatus, which may include wireless apparatus 200 and/or may include one or more other wireless network apparatus 300. Wireless network apparatus 300 may include one or more wireless network apparatus wirelessly linked to wireless apparatus 100 (directly and/or indirectly), and/or may include one or more wireless network apparatus linked to apparatus 100 at least in part through another communications network (through one or more wired and/or wireless links). Wireless connectivity data stored and transmitted by apparatus 100 may include data pertaining to one or more of apparatus 300 (in addition to apparatus 200). Wireless connectivity data from at least one of these other linked wireless network apparatus (200 and/or 300) is received by wireless network apparatus 100 and stored by storage unit 120. In addition to wireless connectivity data, other data may be stored among wireless network apparatus in a similar fashion (described further hereinbelow). Wireless network apparatus 100 may function as one or more or all of: a wireless network access point apparatus, a wireless network terminus, a wireless network node apparatus, and/or a wireless portal node apparatus, and links shown in the Figures are exemplary a should not be construed as limiting the scope of the present disclosure and/or appended claims.

In an exemplary distributed data storage scheme, a direct wireless communications link is established between a wireless network apparatus 10 (circle in FIG. 3) and at least one other wireless network apparatus 20 (squares in FIG. 3; dashed lines indicate direct wireless links between wireless network apparatus), and data for identifying the directly linked other wireless network apparatus 20 are stored in the storage unit of apparatus 10. The identification data for the other network apparatus 20 may be generated by the processor of apparatus 10, or may be received from the other network apparatus 20. Other wireless network apparatus 30 (diamonds in FIG. 3) are then identified that are indirectly linked to wireless apparatus 10 through at most a predetermined maximum number ($N_L$) of direct wireless links involving intervening wireless network apparatus 20 and/or 30 (thus defining a so-called "cloud" of linked devices around apparatus 10). The maximum number of direct links $N_L$ is a predetermined property of a particular portion of a wireless network system. A typical value for $N_L$ might be three. Other values for $N_L$ may be chosen while remaining within the scope of the present disclosure and/or appended claims. Identification data for the indirectly linked apparatus 30 are stored in the storage unit of apparatus 10, and may be generated by the processor of apparatus 10, or may be received from the network apparatus 20 or 30. One or more network pathways between the network apparatus 10 and each of the indirectly linked network apparatus 30 may be identified, and corresponding network pathway data may be included in the wireless connectivity data if needed or desired. Other wireless network nodes (not shown) may be variously indirectly linked to wireless network apparatus 10 by more than $N_L$ direct wireless links, or not linked to wireless network apparatus 10 at all.

Figure 3:
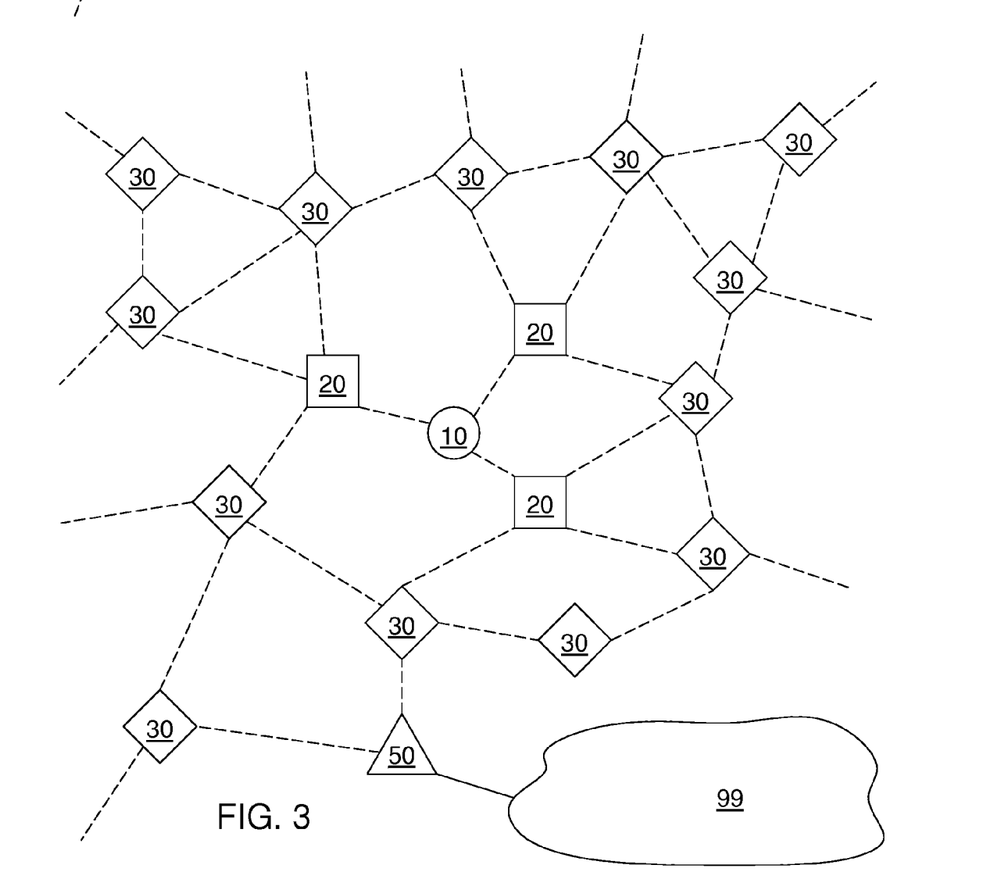
FIG. 3 is a schematic diagram illustrating multiple linked wireless network apparatus.

The wireless network connectivity data pertaining to directly linked network apparatus 20 and indirectly linked network apparatus 30 (i.e. the "cloud" connectivity data) are transmitted from wireless network apparatus 10 to other network apparatus and stored therein. In an exemplary distributed storage scheme such connectivity data may be transmitted to the directly linked network apparatus 20, and to indirectly linked nodes 30 that are indirectly linked to wireless network apparatus 10 by at most a predetermined number ($N_S$) of direct wireless links involving intervening network nodes 20 or 30 (thus defining a so-called "cloud" of storage devices around apparatus 10). It may be convenient for setting up the wireless network if $N_L$ and $N_S$ have the same numerical value (i.e. linked "cloud" and storage "cloud" are the same), however, $N_L$ and $N_S$ need not have the same numerical value, and each may be independently chosen from a wide range of values while remaining within the scope of the present disclosure and/or appended claims.

In addition to transmitting its own connectivity data pertaining to linked other network apparatus 20 and 30, wireless network apparatus 10 may also receive from those directly and indirectly linked wireless network apparatus their analogous connectivity data, and this received data may be stored in the storage unit. The wireless network apparatus 10 therefore contains data describing the local network topology up to $N_L+N_S$ direct links away. In other words, each wireless network apparatus is connected to a wireless "cloud", transmits data describing its "cloud" to the apparatus of its "cloud", and in turn receives and stores data from apparatus of its "cloud" describing their respective "clouds". This data (or analogous wireless connectivity data) may be used to route data packets through the wireless network from an origin or entry point to an exit or destination point using any suitable routing protocol or software. Wireless network traffic data may be included in the connectivity data redundantly stored distributed among the wireless network apparatus, for enabling analysis, enhancement, and/or optimization of the wireless network, for computing billing and/or revenue amounts (described further below), and/or for other network administration purposes.

It is often the case that the wireless communications network, of which wireless network node apparatus 10 and wireless network apparatus 20 and 30 form a portion, is connected via at least one portal node apparatus 50 via a wired connection to another communications network 99 (FIG. 3; solid line indicates a wired communication link). For example, a wireless telephone network may comprises a plurality of wireless network nodes, with at least one wireless network node directly connected (i.e., wired) to another telephone system or network (which may be wired or wireless or a combination thereof) and acting as a wireless portal node apparatus to the other system. In another example, a wireless computer network may comprise a plurality of wireless network nodes, with at least one node directly connected (i.e., wired) to another computer network (which may be wired, wireless, or a combination thereof), such as the Internet, a WAN, a LAN, or other network. In these and other such examples, a wireless portal node apparatus may often be an intermediate destination for data packets arising within or transmitted through the wireless network (with the packet's ultimate destination being somewhere outside the wireless network, e.g. in another wired or wireless network). A portal node may also serve as an entry point for a data packet received from outside the wireless network and transmitted within the wireless network, either to a destination point within the wireless network or through the wireless network to another portal node and thence to a destination point outside the wireless network. It should be noted that a single device (comprising one or more components) may function as a wireless network node, a wireless network access point, and/or a wireless network terminus, as well as a wireless portal node apparatus. In other instances the wireless portal node may function exclusively as a wireless network portal node apparatus.

The wireless network apparatus 10 may identify one or more wireless portal node apparatus to which it is directly or indirectly linked, and may identify one or more network pathways to each of the identified wireless portal nodes. Corresponding wireless portal node identity data and/or portal network pathway data may be stored in the storage unit (and may therefore comprise a portion of the wireless connectivity data), and may be transmitted to directly and indirectly linked wireless apparatus 20 and 30 at most $N_S$ direct wireless links away for storage therein. Analogous wireless portal connectivity data may be received from linked wireless apparatus 20 and 30 from at most $N_S$ direct wireless links away and stored in the storage unit as a portion of their wireless connectivity data.

In some examples of wireless telecommunications networks, most or all of the network nodes are stationary. Time variation of the network topology may arise mainly from adding or removing wireless nodes as the network is constructed or modified, or from intermittent downtime of individual nodes due to power failure, damage, malfunctions, repair, upgrades, and so forth. In other examples of wireless telecommunications networks, many or even all of the wireless network nodes may be mobile, and the network topology may undergo virtually constant evolution of a significant nature. In either of these extremes, the wireless connectivity data may be updated or refreshed to reflect changing wireless network topology, and typically includes time and date data (i.e. a time index or a time stamp). For a wireless network comprising mostly stationary wireless nodes, such updating once or just a few times a day, or even every several days, may be sufficient. For a network comprising many mobile wireless nodes (mounted on vehicles and/or carried by users, for example), such updating of wireless node connectivity data should occur more frequently, perhaps every minute or even every five seconds. In this way data packets may be reliably routed among the wireless network nodes despite the rapidly changing network topology.

Figure 4A:
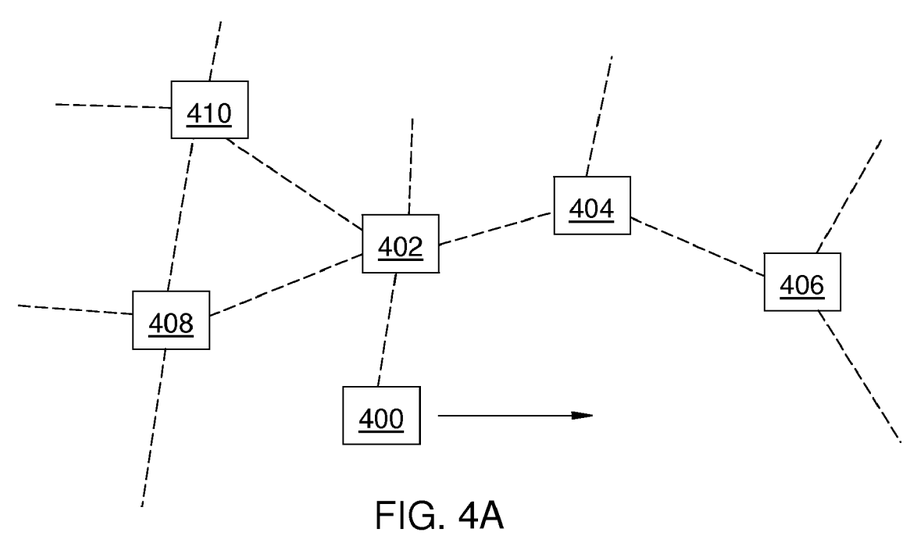
FIGS. 4A and 4B schematically illustrate a mobile wireless network apparatus linked to other wireless network apparatus.
Figure 4B:
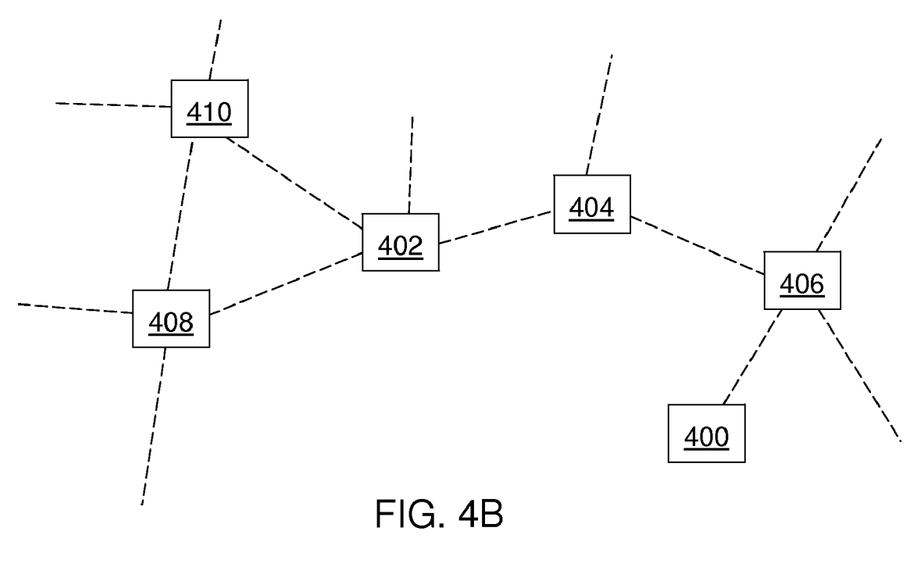

Time-dependent wireless connectivity data may be archived in the storage unit, typically for some pre-determined time period before being purged. For wireless telecommunications networks that include mobile wireless network nodes, such archived connectivity data may be analyzed and employed for predictive routing of data packets among the nodes of the wireless network. For example, if a particular wireless node 400 is identified as directly linked to a wireless node 402, and then later identified as directly linked to a wireless node 404, it may be possible to predict (or at least narrow down the possibilities) which other wireless node 406 or 408 or 410 will be directly linked to node 400 at some still later time, based on an analysis of the archived connectivity data stored at nodes 400, 402, and/or 404 (FIGS. 4A and 4B). In this particular example, the system may assign a higher probability to a direct link at the still later time between node 400 and node 402 or 406 than to a direct link between node 400 and node 408 or 410. Such predictive routing may enable less frequent updating of connectivity data without an undue increase in lost data packets, for example, or may simply enhance the speed and/or reliability of data transmission through the wireless network. The archived connectivity data may cover any desired time period, such as a week, several days, 24 hours, several hours, one hour, or some other suitable time period.

Figure 5:
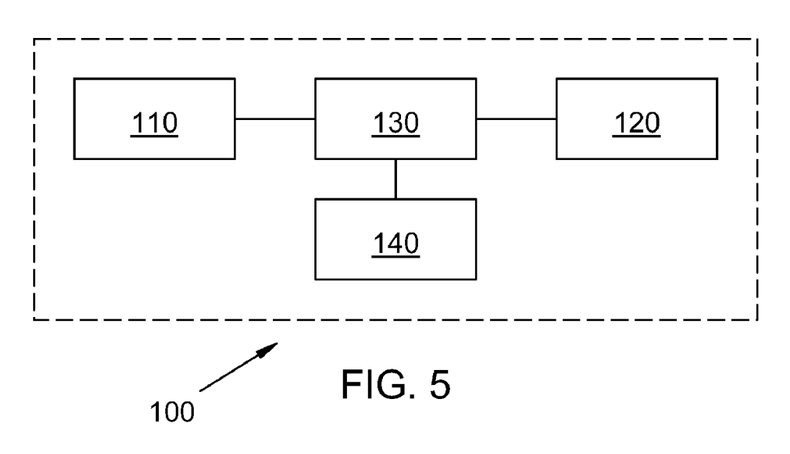
FIG. 5 is a schematic block diagram of an exemplary wireless network apparatus.

In some examples of wireless telecommunications networks, particularly wireless networks including mobile network nodes, it may be desirable to include geo-location data as part of the connectivity data, along with wireless node identification data, portal node identification data, and/or corresponding wireless network pathway data. Such geo-location data may be generated from signals received by a Global Positioning System (GPS) receiver 140 connected to the wireless network node apparatus 100 (FIG. 5), may be generated by triangulating from other directly linked wireless network apparatus, may be generated by receiving from other nearby network apparatus their corresponding geo-location data and estimating therefrom; or may be generated by any other suitable method or apparatus. The geo-location data for mobile network apparatus is typically time-indexed (i.e. includes time and date data), and may include, in addition to spatial position, speed and direction of motion of a mobile wireless network apparatus. Time-indexing or speed/direction data may be employed for predictive routing, as described above. Geo-location data may be updated, at intervals appropriate for the mobility of the network nodes, and geo-location data may be archived and analyzed for predictive routing. Connectivity data that include geo-location data may be used to determine the geographic area covered by the wireless network (or conversely, to determine geographic areas not covered by the wireless network; i.e., "dark spots"). Such geographic coverage data may be stored redundantly distributed among the network apparatus (as described above for connectivity data), may be updated or refreshed (at appropriate intervals), may be archived for varying periods of time (such as the immediately preceding week, for example), and/or may be analyzed for predicting coverage areas at future times.

A mobile wireless network apparatus may be associated with a "home" location. Such a home location may be defined in terms of network connections, or may be defined geographically. For example, the home location may be a specific network address associated with a server, computer, router, portal unit, access point, or other network node or terminus. In another example, the home location may be defined as a physical address or as set of geographic coordinates. The home location may comprise a single device, or a cluster of nearby devices ("nearby" being defined geographically or in terms of network topology). For either type of home definition, the mobile network apparatus may be programmed to transmit its own network connectivity data or geo-location data to the home location for logging, storage, or archiving on a networked device or cluster of devices at or near the home location. In this way a record of movement of the mobile wireless network apparatus may be generated at the home location and used in any desired way. Some of these ways are described further hereinbelow. Due to the potentially changing network topology between the mobile wireless network apparatus and its corresponding home location, the reporting of connectivity or geo-location data to the home location may be virtually instantaneous (enabling near-real-time tracking of the mobile wireless network apparatus) or may lag by minutes, hours, days, or even longer (enabling only after-the-fact tracking of the mobile wireless network apparatus). Any connectivity or geo-location data may thus transmitted may be accompanied by metadata of any suitable type, which may include one or more of transmission "direction" (i.e. the home location), transmission spectrum (i.e. number of parallel network pathways used for transmission), data lifetime (how to keep trying to transmit data, or how long to store data), importance (i.e. transmission priority), authorization data (for restricting access to the transmitted data), data source information (identifying the device transmitting the data), time of transmission (date and time the data was transmitted), location of transmission (location, physical or network, from which the data was transmitted), or other suitable metadata.

A wireless network node apparatus 100 may function as a network router, receiving an incoming data packet and retransmitting it to another network node, to a wireless network terminus, to a wireless access point, and/or wireless network portal node. A wireless network apparatus 100 may function as a wireless access point (i.e., a first link between a wireless network terminus and the rest of the wireless network). A wireless network terminus may function as an origin and/or destination for data packets transmitted by the wireless network, and may include as examples computers, terminals, telephones (including mobile telephones), hand-held digital communications devices, pagers, other user-interface devices, and so on. Such wireless network terminuses may be stationary or mobile. It should be noted that a single device (comprising one or more components) may function as a wireless network node apparatus, a wireless network access point apparatus, a wireless network terminus, and/or a wireless portal node apparatus.

When functioning as a wireless network access point apparatus, the wireless network apparatus 100 identifies network terminuses directly wirelessly linked thereto, and includes terminus identification data with the connectivity data stored in storage unit 120 and transmitted to other linked wireless network apparatus. Connectivity data, including wireless terminus data, from other directly and indirectly linked wireless network apparatus, is received by wireless network node 100 and stored in storage unit 120. The presence of wireless network terminus data in the connectivity data stored redundantly distributed among multiple wireless network apparatus enables appropriate routing of data packets to and from the wireless network terminus through the wireless network. As with other types of connectivity data already described, wireless terminus data may be refreshed at appropriate intervals, may be archived, may be analyzed for predictive routing, may include geo-location data, and so on.

In addition to connectivity data already described, wireless network terminus data may also include user identification data, user authentication data, user billing data, and/or user content data. Users may also be referred to herein as subscribers. Such user data may be received by wireless network apparatus 100 (functioning as a wireless network access point) from wireless network terminuses directly linked thereto and stored in storage unit 120. This user data may be transmitted to other linked wireless network apparatus and stored there, and analogous network terminus user data may be received from the other connected wireless network apparatus and stored in storage unit 120. The network terminus user data may be updated at appropriate intervals, and may be archived for an appropriate length of time.

The storage of such user-related data in the distributed manner described in the previous paragraph may enhance the reliability and security of the wireless network. Each time a user establishes a direct wireless link between his/her wireless network terminus and wireless network apparatus (i.e., access point), the apparatus may require authentication of the user before permitting access to the wireless network. Such authentication maybe implemented in any suitable manner, including but not limited to password, digital key, digital certificate, encryption, and so on. Redundant and distributed storage of the authentication data permits a user of a mobile wireless network terminus to move about the area covered by the wireless network and remain connected to the network. Updating of user-related identification/authentication data among the wireless network nodes enables a user's data to "follow" him/her as he/she moves around within an area covered by the wireless network with a mobile wireless network terminus unit (notebook computer, wireless telephone, hand-held device, etc.), thereby enabling the user to maintain access to the wireless network. User identification/authentication data stored among the network nodes may also include network firewall data for controlling transmission of data packets to and from the network terminus, and for enabling the wireless network node apparatus to function as a network firewall for the network terminus. It should be noted that such distribution of access, authentication, billing, data, and so forth renders the wireless system essentially immune to a crash or other malfunction of a central administration unit or system, since its functionality is redundantly spread among multiple wireless network apparatus.

Figure 6A:
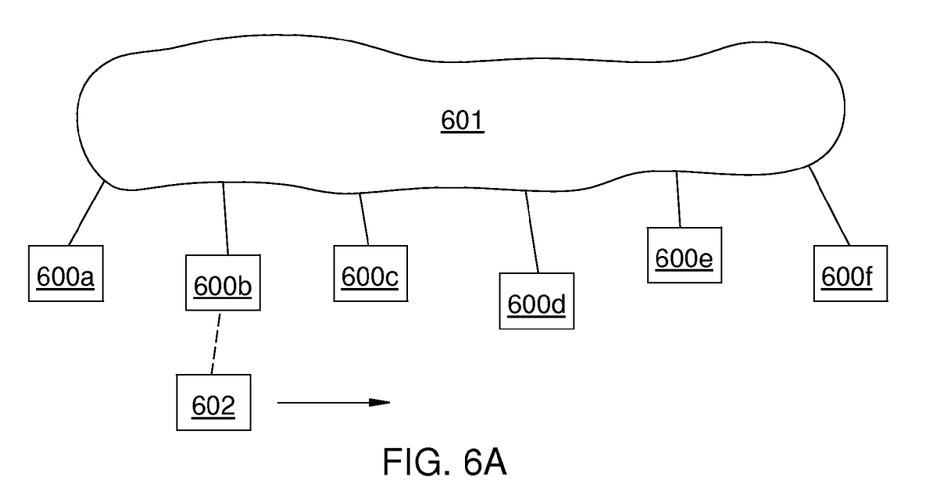
FIGS. 6A and 6B schematically illustrate a mobile wireless network apparatus linked to other wireless network apparatus.
Figure 6B:
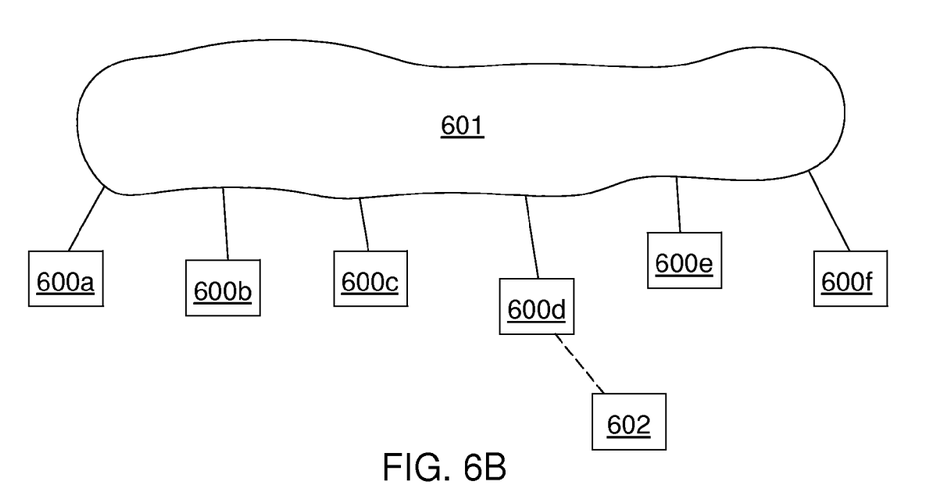

In an exemplary implementation of a wireless communications network (FIGS. 6A and 6B), multiple wireless network apparatus 600 (i.e., 600*a*, 600*b*, etc) may each function as both a wireless access point as well as a wireless portal to a communications network 601. The wireless apparatus 600 may or may not be wirelessly linked to one another. Wireless network terminus data for a network terminus 602 may be stored by one of the wireless apparatus 600 to which it is directly linked, and transmitted to and stored by the others among the wireless apparatus 600 (wirelessly an/or via network 601). A mobile network terminus 602 may move about within a space covered by multiple network apparatus 600 while retaining access to authentication, billing, and/or other network functionalities.

Figure 7A:
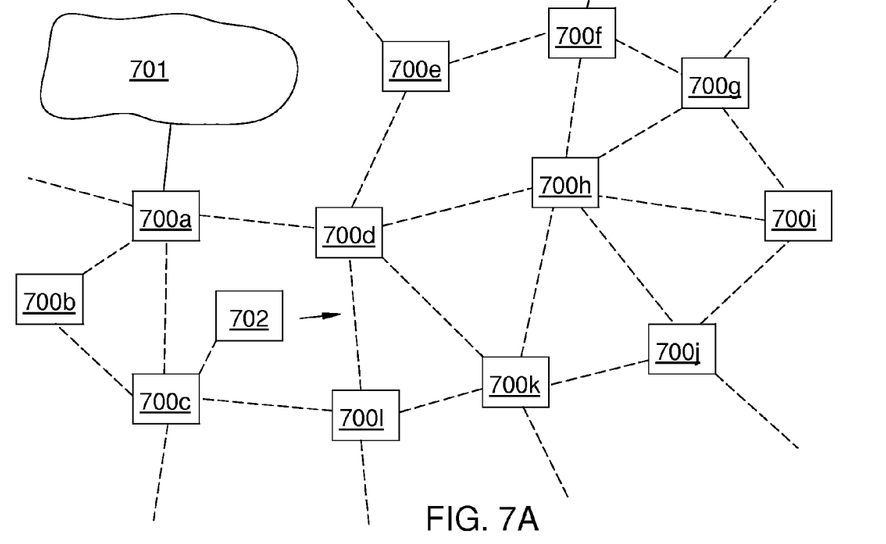
FIGS. 7A and 7B schematically illustrate a mobile wireless network apparatus linked to other wireless network apparatus.
Figure 7B:
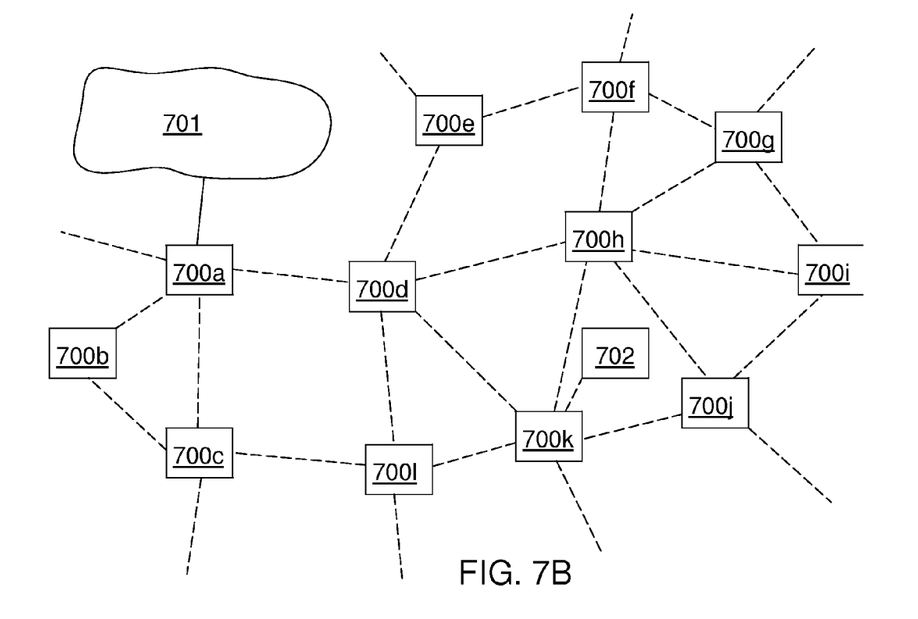

In an exemplary implementation of a wireless communications network (FIGS. 7A and 7B), multiple wireless network apparatus 700 (i.e., 700*a*, 700*b*, etc) may each function both as a node of a wireless network and as a wireless access point, while one or more (700*a* in FIGS. 7A and 7B) may also function as a wireless portal to a communications network 701. Wireless network terminus data for a network terminus 702 may be stored by one of the wireless apparatus 700 to which it is directly linked, and transmitted to and stored by the others among the wireless apparatus 700 (wirelessly an/or via network 701). A mobile network terminus 702 may move about within a space covered by multiple network apparatus 700 while retaining access to authentication, billing, and/or other network functionalities. Note that one or more of the wireless network apparatus 700 may be mobile as well.

The wireless network apparatus (portals, nodes, and/or access points) may additionally function as redundant and distributed storage units for user content data of any suitable type (examples including, but not limited to, application data, documents, media content, and so forth). Such storage of user content data may serve as a redundant and distributed backup of the data, enhancing a user's ability to recover lost data in the event of its loss from the network terminus unit, and even if the user content data is lost from some of the wireless network apparatus. Redundant and distributed storage may also serve as the primary storage, and may also allow user access to larger amounts of data than could be stored locally within his/her network terminus unit. Updating the user data as described above (including the content data) at appropriate temporal intervals may enable the user's content data to "follow" him/her as he/she moves around with the network terminus unit within an area covered by the wireless network, and insure that backed-up user data is up to date.

Fees may often be charged to users for access to the wireless network. Such fees may be based on a periodic subscription fee, packets transmitted and/or received, time connected to the network, volume of data storage, and/or any other suitable use parameter(s). User data stored redundantly distributed among the wireless network nodes may include user billing data. An owner of a network node apparatus may receive revenue from an administrator of the wireless network, which may be based on a periodic usage fee, volume of data received and/or transmitted, time connected to the wireless network, and/or other suitable use parameter(s). Connectivity data for the wireless network node stored redundantly distributed among the directly and indirectly linked other wireless network nodes may include revenue data, which may be updated at appropriate intervals and/or archived for a suitable period of time.

Secure storage by the wireless network nodes may be employed for data of the various types described herein. Access to user content data may be restricted to the respective users. Access to network connectivity data and/or revenue data may be restricted to an owner of the wireless network node apparatus and/or an administrator of the wireless network. Access to network connectivity data, user identification and authentication data, and user billing data may be restricted to an administrator of the wireless network. Other access schemes may be employed within the scope of the present disclosure and/or appended claims. Access to various securely stored data by those authorized may be restricted using any suitable form of authentication, including but not limited to, passwords, digital keys, digital certificates, encryptions, and so on. Redundant and distributed storage of the data of the various types described above may enable detection of corrupt data stored by one or more of the wireless network nodes. Various of the data stored by a network node apparatus may be compared to data stored by directly and indirectly linked network nodes, and data may be corrected based on discrepancies detected. Such comparisons and corrections may be performed at appropriate temporal intervals to ensure integrity of the data. In the event that corrupt data cannot be corrected, or in the event that unauthorized access to a wireless network node apparatus is detected (including physical access to the hardware), a wireless network node thus compromised may be intentionally disabled so as to prevent further unauthorized access to the wireless network. Security of the stored data may be enhanced by storage of different portions of the data on different wireless network apparatus, so that even if an apparatus is compromised, unauthorized access may be gained to only a portion of the data that is unintelligible or unusable in the absence of the rest of the data. (As an example, the first half of each user's credit card number could be redundantly stored by a first group of network apparatus, while the second half of each user's credit card number could be redundantly stored by a second separate group of network apparatus.)

Various of the data of the types described may be made generally available, with the wireless network apparatus acting as a server. For example, network pathway data, network node data, geographic coverage area, and so forth may be made generally available to a wireless network administrator, owners of wireless network apparatus, and/or users of the wireless network and may be served from one or more of the wireless network apparatus. Availability of such served data may enable, for example, a user to find a covered area to move to or a network pathway along which to transmit or receive data, or may guide an owner of a mobile wireless network node or access point to move to a new location and establish wireless network coverage over a previously non-covered area. Many other uses of served data shall fall within the scope of the present disclosure and/or appended claims.

A wireless communications network implemented according to the present disclosure may comprise i) multiple wireless network apparatus owned and administered by a single entity (a person, group, or organization); ii) multiple wireless network nodes variously owned by multiple owners but administered by a single central network administrating entity; iii) multiple wireless network nodes variously owned and administered by multiple owners/administrators; or iv) combinations of these. If there is centralized administration of multiple wireless network apparatus, an administration unit is typically employed and linked to the administered wireless network apparatus. The administration unit may be indirectly or indirectly wirelessly linked to one or more of the administered wireless network nodes, or may be linked to the administered wireless network apparatus through a portal node apparatus. Various of the data of the types described herein may be transmitted to and stored by the administration unit. Such data may be updated at appropriate intervals, and archived for suitable periods of time, and may be used in any of the ways described above for similar data stored by one or more of the wireless network nodes themselves. Computation of revenue amounts for wireless network nodes and/or billing data for users or network terminuses may be performed by the central administration unit.

A wireless network apparatus as disclosed herein may comprise a discrete, dedicated wireless network communication device, or instead may be attached to or incorporated into other objects. Examples of such objects may include, but are by no means limited to: a portable computer, PDA, mobile phone, mobile email device, or other mobile network device; a person; a piece of clothing; a wallet, purse, keys, briefcase, fannypack, backpack, or luggage; a vehicle (human-powered or mechanically powered); pets or livestock; recreation equipment; or any other mobile object that may be useful to track. A wireless network apparatus may function as a network terminus, a network access point, or a network node while attached to or incorporated into another object. Connectivity or location data generated and transmitted to other nearby wireless network apparatus or to a "home" location may be employed for tracking the object, either in real time, or after the fact. Owner identification data may be included with the connectivity data or geo-location data.

Figure 8:
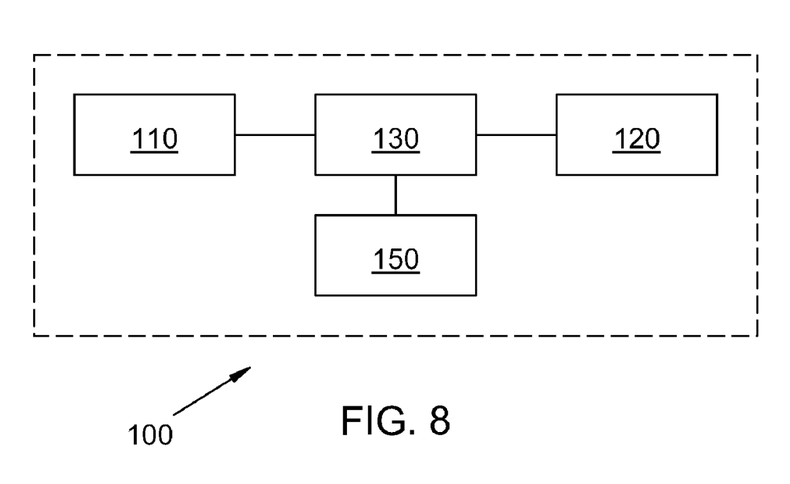
FIG. 8 is a schematic block diagram of an exemplary wireless network apparatus.

A wireless network apparatus attached to or incorporated into an object may further include one or more data collection units 150 (FIG. 8). Such data collection units may include, but are not limited to: cameras (still or video); microphones; biometric sensors; velocity or acceleration meters (linear or angular); temperature sensors; light meters; chemical, biochemical, or biologic sensors; radiation sensors; or other suitable sensors or meters. Data collected by collection unit 150 may be processed and stored in storage unit 120, may be stored locally distributed among other nearby wireless network devices (as described hereinabove), or may be transmitted to the "home" location. Suitable metadata may be associated and transmitted with the collected data. Examples of data that might be collected include, but are not limited to: moving or still images of the wireless unit's surroundings; sounds recorded by the wireless unit; sudden movement or acceleration (perhaps indicative of a fall or collision); changes in physiological conditions (pulse, respiration, blood pressure, blood levels of various compounds), which might indicate illness, injury, or a hazardous or frightening situation; or any other suitable recordable data. Numerous other examples of collected data could be listed, and any collected data shall fall within the scope of the present disclosure. Transmission, storage, archiving, access, prediction, metadata, or other acts or functions or adaptations described hereinabove in association with stored or transmitted connectivity or geo-location data may be implemented for any collected data as well.

In addition to collecting its own data, a wireless network apparatus may also receive and store collected data from other suitably equipped wireless network apparatus. In just one of numerous examples, a wireless network apparatus with a video camera incorporated into a piece of clothing might record the visual surroundings of a person throughout the course of a day, while at the same time receiving video recordings of the person made by nearby devices over the course of the same day. All of this video data may be stored locally distributed, and may also be transmitted to the home location of the person. A richly detailed visual record of the person's day may be extracted from the collected data. This example or others could be employed in the areas of public safety, law enforcement, criminal justice, medical research and records, demographic research, recreational purposes (e.g. producing a detailed vacation video), or in many other areas.

Access to the acquired data may be restricted in any suitable way to authorized entities, at specific times, under specified circumstances, and so on. For example, access to acquired data might be given only to the owner of the data acquisition unit, unless a sudden acceleration is detected (indicative of a fall or auto accident), in which case the terminus data or connectivity data (including geo-location) might be made available to emergency personnel. Many other examples of such data access schemes may be implemented, and shall fall within the scope of the present disclosure or appended claims.

For purposes of the present written description and/or claims, the terms "network access" or "online access" shall denote an activity which is performed by sending and/or receiving text, data, graphics, images, commands, requests, queries, and so forth over a communications network through a network terminus (i.e., a user interface device). This may typically mean using a computer connected to the Internet, but may also include other interface devices (including but not limited to: computers, workstations, terminals, televisions, wireless devices, hand-held or "palm-top" devices, electronic organizers, telephones, wireless telephones, messaging units, and the like; combinations thereof; and/or functional equivalents thereof) and other networks (Internet, Internet 2, next-generation Internet, other successors to the Internet, World-Wide Web, telephone networks, local- or wide-area networks, wireless networks, optical networks, satellite-based networks, and the like; combinations thereof; and/or functional equivalents thereof). The connection or link between the interface device and the communications network for online access may be wired and/or wireless, the latter of which is the primary subject matter of the present disclosure.

The terms "wired" and "wireless" as employed herein denote, respectively, connections established by transmission of signals over some sort of transmission member, and signals transmitted through free space without a transmission member. The transmission member for a wired connection may comprise a wire carrying electronic signals, but may also comprise any other suitable transmission member for transmitting signals of any suitable type, or combinations thereof. Optical signals carried by optical waveguides and/or optical fibers would be considered a wired connection, for example. "Wireless transmitter" and "wireless receiver" shall generally denote devices which may send and receive, respectively, signals that propagate through free space in the form of electro-magnetic radiation. The electro-magnetic radiation is typically in the RF or microwave region, although other portions of the electro-magnetic spectrum may be utilized as well.

For purposes of the present disclosure and appended claims, the conjunction "or" is to be construed inclusively (e.g., "a dog or a cat" would be interpreted as "a dog, or a cat, or both"; e.g., "a dog, a cat, or a mouse" would be interpreted as "a dog, or a cat, or a mouse, or any two, or all three"), unless: i) it is explicitly stated otherwise, e.g., by use of "either . . . or", "only one of . . . ", or similar language; or ii) two or more of the listed alternatives are mutually exclusive within the particular context, in which case "or" would encompass only those combinations involving non-mutually-exclusive alternatives. It is intended that methods employing the apparatus and systems disclosed herein shall fall within the scope of the present disclosure or appended claims. It is intended that equivalents of the disclosed exemplary embodiments and methods of their use shall fall within the scope of the present disclosure or appended claims. It is intended that the disclosed exemplary embodiments and methods, and equivalents thereof, may be modified while remaining within the scope of the present disclosure or appended claims.

What is claimed is:

1. A wireless network apparatus, comprising:
   a wireless transmitter and receiver operated according to at least one recognized wireless communications protocol;
   a data storage unit; and
   a processor operatively coupled to the data storage unit and to the wireless transmitter and receiver, and programmed for
   establishing via the wireless transmitter and receiver a wireless communications link between the wireless network apparatus and at least one other wireless network apparatus, and identifying each such wirelessly linked other wireless network apparatus,
   storing in the data storage unit wireless connectivity data including identification data pertaining to other wireless network apparatus wirelessly linked to the wireless network apparatus,
   transmitting said wireless connectivity data to at least one other wireless network apparatus, said transmitted data for storage at the other wireless network apparatus to which it is transmitted, and
   receiving and storing in the data storage unit additional wireless connectivity data from at least one other wireless network apparatus.

2. The apparatus of claim 1, wherein the processor is further programmed for:
   establishing a direct wireless communications link between the wireless network apparatus and at least one other wireless network apparatus and identifying each such directly linked wireless network apparatus,
   identifying other wireless network apparatus indirectly linked to the wireless network apparatus via at most a predetermined first maximum number of direct wireless links involving at least one intervening other wireless network apparatus,
   storing in the data storage unit wireless connectivity data including identification data pertaining to said directly and indirectly linked other wireless network apparatus, transmitting the stored wireless connectivity data to said directly linked other wireless network apparatus and to said indirectly linked other wireless network apparatus linked via at most a predetermined second maximum number of direct wireless links for storage at the other wireless network apparatus to which it is transmitted, and receiving and storing in the data storage unit additional wireless connectivity data from said directly linked other wireless network apparatus and said indirectly linked other wireless network apparatus linked via at most the second maximum number of direct wireless links.

3. The apparatus of claim 2, wherein the first maximum number is at least three and the second maximum number is at least three.

4. The apparatus of claim 1, wherein the recognized wireless communications protocol is an 802.11 protocol, an 802.16 protocol, or a wireless telephone protocol.

5. The apparatus of claim 1, wherein the processor is further programmed for:

establishing a wireless communications link to at least one wireless portal node connected to another communications network via a wired connection and identifying each such wireless portal node; and including in the stored, transmitted, and received wireless connectivity data wireless portal node identity data as a portion of the wireless connectivity data.

6. The apparatus of claim 5, wherein the other communications network comprises the Internet or a telephone system.

7. The apparatus of claim 1, wherein the processor is further programmed for enabling the wireless network apparatus to function as a wireless network access point apparatus, as a wireless network node apparatus, as a wireless network terminus, or as a wireless portal apparatus.

8. The apparatus of claim 7, wherein the processor is further programmed for enabling the wireless network apparatus to function as a wireless network access point apparatus, the processor being further programmed for:

establishing a direct wireless communications link between the wireless network node apparatus and at least one wireless network terminus;

receiving a data packet from the wireless network terminus and re-transmitting the data packet thus received based on stored wireless connectivity data; and receiving a data packet and re-transmitting the data packet thus received to the wireless network terminus based on stored wireless connectivity data.

9. The apparatus of claim 7, wherein the processor is further programmed for enabling the wireless network apparatus to function as a wireless network node apparatus, the processor being further programmed for receiving a data packet from a directly wirelessly linked other wireless network apparatus and re-transmitting the received data packet to another directly wirelessly linked other wireless network apparatus selected based on stored connectivity data.

10. The apparatus of claim 7, wherein the processor is further programmed for enabling the wireless network apparatus to function as a wireless network terminus, the processor being further programmed for:

establishing a direct wireless communications link between the wireless network terminus and at least one other wireless network apparatus;

transmitting a data packet to a directly linked other wireless network apparatus; and receiving a data packet from a directly linked other wireless network apparatus.

11. The apparatus of claim 7, further comprising a wired connection to another communications network, wherein the processor is further programmed for enabling the wireless network apparatus to function as a wireless portal apparatus, the processor being further programmed for:

receiving a data packet from the other communications network via the wired connection and re-transmitting the data packet thus received to a linked other wireless network apparatus selected based on stored connectivity data; and receiving a data packet from a linked other wireless network apparatus and re-transmitting the data packet thus received to the other communications network via the wired connection.

12. The apparatus of claim 7, wherein the processor is further programmed for:

storing wireless network terminus data in the data storage unit;

receiving wireless network terminus data from wireless network terminuses linked directly to the wireless network node apparatus and storing and storing said received wireless network terminus data in the data storage unit; or generating wireless data packet traffic data for the wireless network apparatus and storing said wireless data packet traffic data in the data storage unit.

13. The apparatus of claim 12, wherein the processor is further programmed for:

transmitting the wireless network terminus data or the wireless data packet traffic data to at least one other wireless network apparatus, said transmitted data for storage at the other wireless network apparatus to which it is transmitted; or receiving and storing in the data storage unit additional wireless network terminus data or additional wireless data packet traffic data from at least one other wireless network apparatus.

14. The apparatus of claim 13, wherein the processor is further programmed for:

transmitting the wireless network terminus data or the wireless data packet traffic data to directly linked wireless network apparatus and to indirectly linked wireless network apparatus linked via at most a predetermined maximum number of direct wireless links involving intervening wireless network apparatus, said transmitted data for storage at the wireless network apparatus to which it is transmitted; or receiving and storing in the data storage unit additional wireless network terminus data or additional wireless data packet traffic data from directly wirelessly linked other wireless network apparatus and from indirectly wirelessly linked other network apparatus linked via at most the maximum number of direct wireless links.

15. The apparatus of claim 12, wherein the processor is further programmed for refreshing the wireless network terminus data or the wireless data packet traffic data.

16. The apparatus of claim 12, wherein the processor is further programmed for:

generating and storing wireless network terminus billing data or wireless network terminus revenue data as a portion of the network terminus data; or generating and storing wireless network billing data or wireless network revenue data as a portion of the wireless data packet traffic data.

17. The apparatus of claim 12, wherein the processor is further programmed for:

authenticating a wireless network terminus or a user thereof;

including authentication data as a portion of the wireless network terminus data;

including user content data as a portion of the wireless network terminus data;

securely storing at least a portion of the wireless network terminus data;

functioning as a network firewall for the wireless network terminus; or detecting corrupt wireless network terminus data stored in the data storage unit by comparison with wireless network terminus data stored by at least one other wireless network apparatus, and restoring corrupt wireless network terminus data using wireless network terminus data stored by at least one other wireless network apparatus.

18. The apparatus of claim 12, wherein the processor is further programmed for transmitting to a network administration unit at least a portion of the wireless network terminus data or at least a portion of the wireless data packet transmission data.

19. The apparatus of claim 18, wherein the processor is further programmed for:

including authentication data as a portion of the wireless network terminus data transmitted to the network administration unit;

transmitting to the administration unit an authentication request for a wireless network terminus or a user thereof; and receiving from the administration unit authentication for the wireless network terminus or the user thereof.

20. The apparatus of claim 1, wherein the processor is further programmed for refreshing the stored wireless connectivity data.

21. The apparatus of claim 20, wherein the processor is further programmed for periodically refreshing stored wireless connectivity data at least once every day, at least once every hour, at least once every minute, or at least once every five seconds.

22. The apparatus of claim 20, wherein the processor is further programmed for archiving previous wireless connectivity data.

23. The apparatus of claim 22, wherein the processor is further programmed for predicting future wireless connectivity data based on archived wireless connectivity data.

24. The apparatus of claim 20, wherein the processor is further programmed for transmitting, in response to a received request, the stored wireless connectivity data.

25. The apparatus of claim 1, wherein the wireless connectivity data include, for at least one wireless network apparatus, corresponding geo-location data.

26. The apparatus of claim 25, wherein:

the wireless network apparatus further comprises a GPS receiver for generating the geo-location data;

the processor is further programmed for computing the geo-location data by triangulating from other nearby wireless network apparatus; or the processor is programmed for generating the geo-location data based on geo-location data received from at least one other nearby wireless network apparatus.

27. The apparatus of claim 25, wherein the geo-location data include corresponding speed and direction of motion.

28. The apparatus of claim 25, wherein the processor is further programmed for:

generating geographic coverage data for the wireless network apparatus and the linked other wireless network apparatus based on the stored wireless connectivity data, and storing the generated geographic coverage data as a portion of the wireless connectivity data; or storing as a portion of the wireless connectivity data geo-location data, date, and time of non-coverage if the wireless network apparatus cannot establish any link to another wireless network apparatus.

29. The apparatus of claim 25, wherein the wireless network apparatus is attached to or incorporated into a person or an object, and the processor is further programmed for generating and storing tracking data for the person or the object as a portion of wireless network terminus data.

30. The apparatus of claim 29, wherein the network connectivity data includes identification of a home location associated with the wireless network apparatus, and the processor is further programmed for transmitting at least a portion of the wireless network terminus data to the home location.

31. The apparatus of claim 29, further comprising a data acquisition unit operatively coupled to the data storage unit or the processor, wherein the processor is further programmed for storing data acquired by the data acquisition unit as a portion of the wireless network terminus data.

32. The apparatus of claim 31, wherein the data acquisition unit comprises a still camera, a video camera, a microphone, a biometric sensor, a velocity meter, an acceleration meter, a temperature sensor, a chemical sensor, a biochemical sensor, a biologic sensor, or a radiation sensor.

33. The apparatus of claim 31, wherein the processor is programmed for generating metadata associated with the acquired data, and storing the metadata as a portion of the wireless network terminus data.

34. The apparatus of claim 29, wherein the processor is further programmed for:

transmitting the wireless network terminus data, said transmitted data for storage at the other wireless network apparatus to which it is transmitted; or receiving and storing in the data storage unit additional wireless network terminus data from at least one other wireless network apparatus.

35. The apparatus of claim 34, wherein the processor is further programmed for:

transmitting the wireless network terminus data to directly linked wireless network apparatus and to indirectly linked wireless network apparatus linked via at most a predetermined maximum number of direct wireless links involving intervening wireless network apparatus, said transmitted data for storage at the wireless network apparatus to which it is transmitted; or receiving and storing in the data storage unit additional wireless network terminus data or additional wireless data packet traffic data from directly wirelessly linked other wireless network apparatus and from indirectly wirelessly linked other network apparatus linked via at most the maximum number of direct wireless links.

36. The apparatus of claim 29, wherein the processor is further programmed for restricting access to the network terminus data to authorized entities, to specified times, or to specified circumstances.

37. The apparatus of claim 1, wherein the processor is further programmed for transmitting to a network administration unit for the wireless network at least a portion of the wireless connectivity data.

38. The apparatus of claim 37, wherein the processor is further programmed for:

receiving from the administration unit wireless network routing instructions; and re-transmitting a received data packet according to the received routing instructions.

39. The apparatus of claim 37, wherein the processor is further programmed for receiving from the administration unit instructions for moving the wireless network apparatus to a new geographic location for expanding a wireless network geographic coverage area.

40. The apparatus of claim 39, wherein the processor is further programmed for computing or receiving from the administration unit a revenue amount earned for expanding the wireless network geographic coverage area.

41. The apparatus of claim 1, wherein the processor is further programmed for discontinuing wireless communication links in response to attempted unauthorized access to the data storage unit or the wireless network.

42. The apparatus of claim 1, wherein the network connectivity data includes identification of a home location associated with the wireless network apparatus, and the processor is further programmed for transmitting at least a portion of the wireless network terminus data to the home location.

\* \* \* \* \*